United States Patent
Ohmine

(10) Patent No.: US 8,362,816 B2
(45) Date of Patent: Jan. 29, 2013

(54) REDUCING AN EMI EFFECT BY PREVENTING THE DIFFUSE WIDTH WITH THE SSCG FROM BEING LIMITED BY THE JITTER STANDARD VALUE IN A STRUCTURE IN WHICH THE PLL CIRCUIT IS MOUNTED

(75) Inventor: Toru Ohmine, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 143 days.

(21) Appl. No.: 13/047,181

(22) Filed: Mar. 14, 2011

(65) Prior Publication Data

US 2011/0228284 A1    Sep. 22, 2011

(30) Foreign Application Priority Data

Mar. 18, 2010    (JP) ................... 2010-063310

(51) Int. Cl.
*H03L 7/06*    (2006.01)
*G06F 15/00*    (2006.01)

(52) U.S. Cl. ...................... 327/156; 358/1.11

(58) Field of Classification Search ............... 358/1.11; 327/156

See application file for complete search history.

(56) References Cited

FOREIGN PATENT DOCUMENTS

JP    2001-094734    4/2001

*Primary Examiner* — Benny Q Tieu
*Assistant Examiner* — Eric A Rust
(74) *Attorney, Agent, or Firm* — IPUSA, PLLC

(57) ABSTRACT

A disclosed image forming apparatus includes a recording unit which records image data on a recording medium; a first spread spectrum clock generator receiving a first clock signal, providing the first clock signal with frequency diffusion to have a first predetermined frequency diffusion width, and outputting a second clock signal; a PLL circuit outputting a third clock signal synchronously oscillating at a frequency obtained by multiplying the frequency of the first clock signal; an image processing unit receiving the third clock signal, and outputting the processed image data in synchronism with the third clock signal; a speed conversion unit receiving the second and third clock signals, and receiving and outputting the image data in synchronism with the second clock signal; and an input and output control unit outputting the image data to the recording unit in synchronism with the second clock signal.

15 Claims, 11 Drawing Sheets

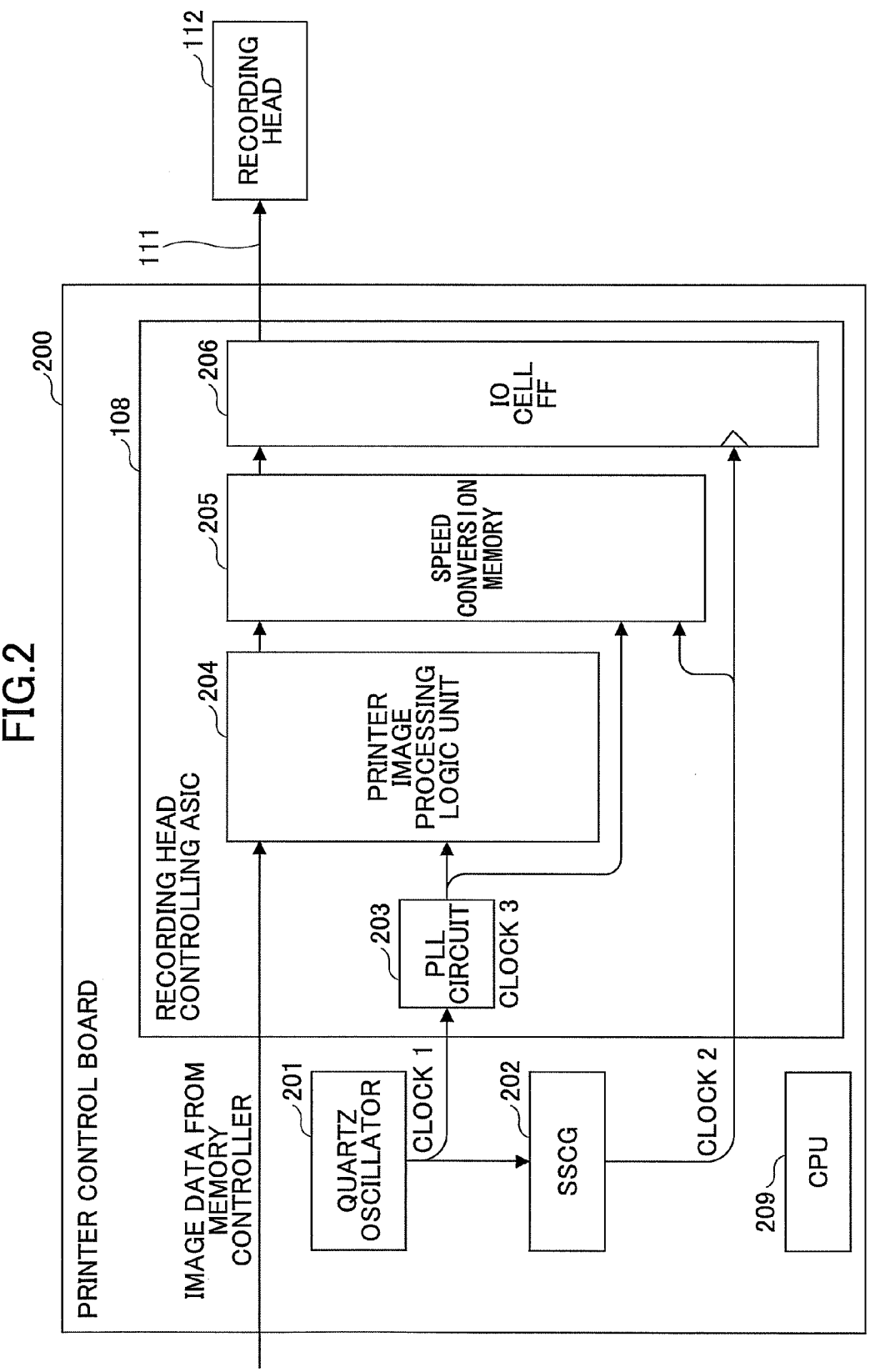

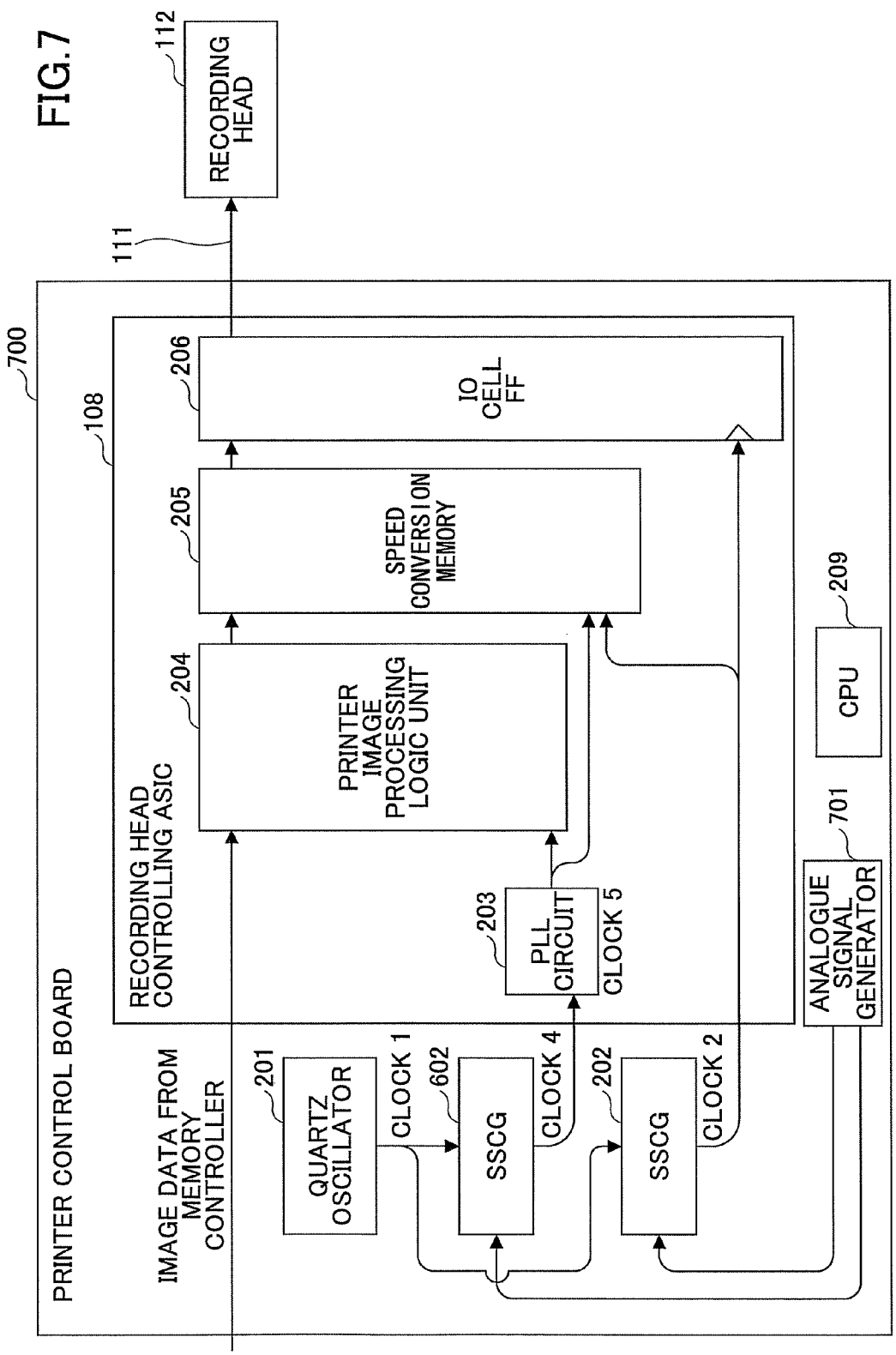

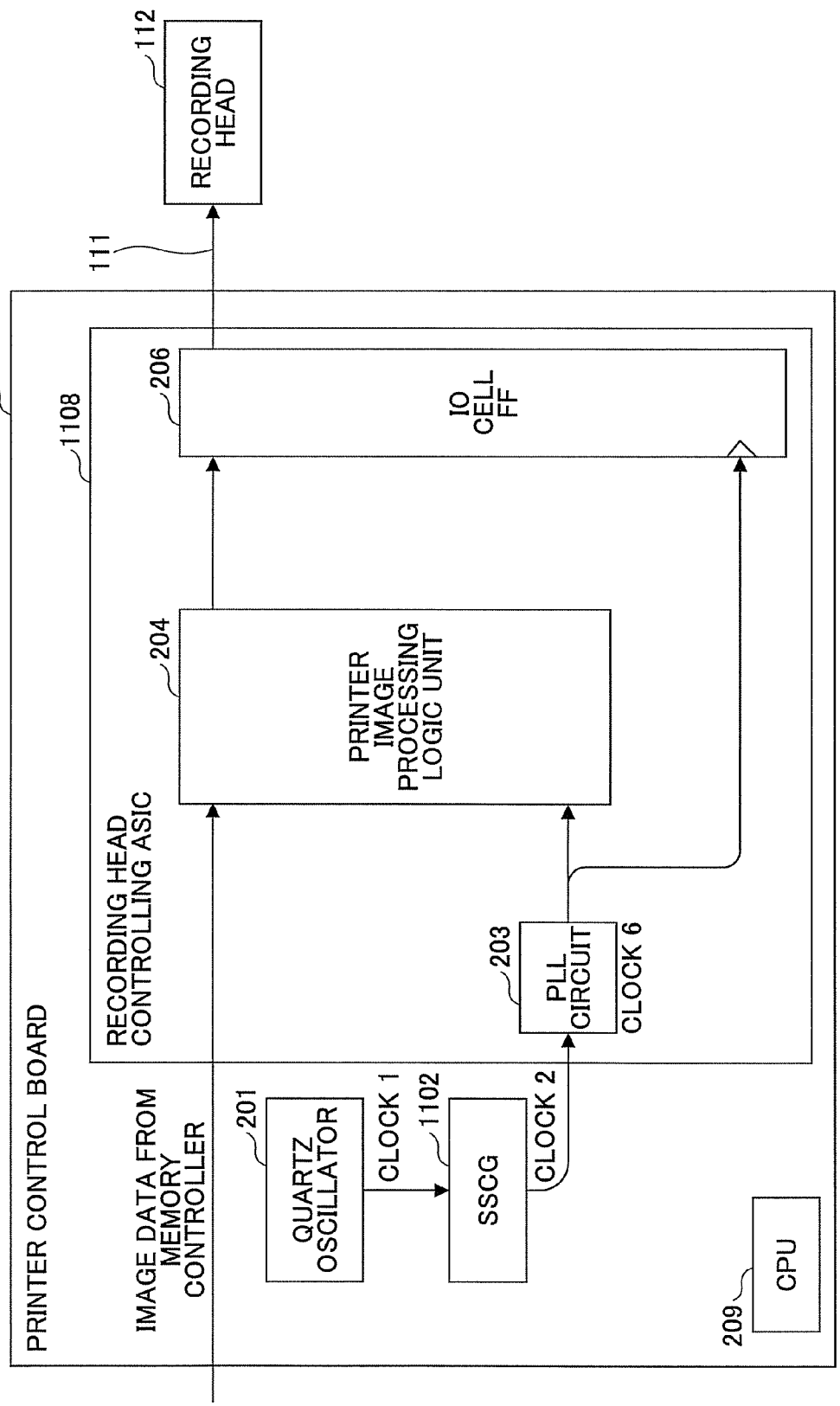
RELATED ART FIG.11

REDUCING AN EMI EFFECT BY PREVENTING THE DIFFUSE WIDTH WITH THE SSCG FROM BEING LIMITED BY THE JITTER STANDARD VALUE IN A STRUCTURE IN WHICH THE PLL CIRCUIT IS MOUNTED

BACKGROUND OF THE INVENTION

1. Field of the Invention

The present invention generally relates to an image forming apparatus, an electric apparatus, and a recording control method.

2. Description of the Related Art

One type of a Spread Spectrum Clock Generator (SSCG) is used for preventing Electro-Magnetic Interference (EMI) for avoiding electro-magnetic noise emitted from an electric apparatus and an image forming apparatus. By modulating the frequencies of clock signals with the one type of SSCG, it is possible to decrease a peak value of a frequency spectrum of the clock signal. With this, it is possible to reduce the emitted electromagnetic noise.

In avoiding electro-magnetic noise, EMI prevention using the one type of SSCG can substantially reduce manufacturing costs of electric apparatuses and image forming apparatuses while maintaining an EMI reducing effect very well. On the other hand, there is a system which cannot allow frequency modulation using an SSCG. An example technique using EMI prevention with the SSCG is provided to reduce a diffuse width with the SSCG down to a tolerance level or separate a system causing operating trouble to thereby apply the EMI prevention with the SSCG only to a system causing no operating trouble.

The technique of Patent Document 1 is provided to reduce a cost for the EMI prevention by enabling a use of the SSCG for the EMI prevention in an image reading apparatus. In this, a timing circuit of the image reading apparatus is divided into an analog clock generating circuit and a digital clock generating circuit. A reference clock signal from a reference clock oscillator is used in the analog clock generating circuit, and a spread spectrum clock from a SSCG is used in the digital clock generating circuit.

According to the technique of EMI prevention using the one type of SSCG, the diffusion width with the SSCG is limited by a jitter standard value of a Phase Locked Loop (PLL) circuit when the PLL circuit is mounted in an application specific integrated circuit (ASIC) or a Field Programmable Gate Array (FPGA) in an image forming apparatus including a control board in which the ASIC or the FPGA is mounted. Therefore, in the example technique, the diffusion width with the SSCG may be lowered to the tolerance level based on the jitter standard value, of the PLL circuit. As a result, there may be a problem in obtaining a sufficient EMI reducing effect.

In the technique described in Patent Document 1, there are similar problems in which the diffusion width with the SSCG may be limited by the jitter standard value of the PLL circuit and a sufficient EMI reducing effect is not obtainable.

Patent Document 1: Japanese Laid-Open Patent Application No. 2001-094734.

SUMMARY OF THE INVENTION

Accordingly, embodiments of the present invention may provide a novel and useful image forming apparatus, an electric apparatus, and a recording control method solving one or more of the problems discussed above. More specifically, the embodiments of the present invention may provide an image forming apparatus, an electric apparatus, and a recording control method with which an EMI reducing effect is improved by preventing the diffuse width with the SSCG from being limited by the jitter standard value in a structure in which the PLL circuit is mounted.

One aspect of the embodiments of the present invention may be to provide an image forming apparatus including: a recording unit configured to record image data on a recording medium; a first spread spectrum clock generator configured to receive a first clock signal, provide the first clock signal with frequency diffusion to have a first predetermined frequency diffusion width, and output a second clock signal which is provided with the frequency diffusion; a PLL circuit configured to receive the first clock signal and output a third clock signal synchronously oscillating at a frequency obtained by multiplying the frequency of the first clock signal; an image processing unit configured to receive the third clock signal, provide the image data with image processing, and output the processed image data in synchronism with the third clock signal; a speed conversion unit configured to receive the second and third clock signals, receive the processed image data in synchronism with the third clock signal, and output the processed image data in synchronism with the second clock signal; and an input and output control unit configured to receive the image data output from the speed conversion unit and the second clock signal, and output the image data to the recording unit in synchronism with the second clock signal.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 2 is a block diagram illustrating a functional structure of a printer control board.

FIG. 7 is a block diagram illustrating a functional structure of a printer control board 700 of Embodiment 3.

FIG. 11 is a block diagram illustrating a functional structure of a comparative example printer control board.

DETAILED DESCRIPTION OF THE PREFERRED EMBODIMENTS

A description is given below, with reference to FIG. 1 through FIG. 10 of embodiments of the present invention. Reference symbols typically designate as follows:
101: Host PC;
102: Memory controller;
103: Printer interface;
105: HDD;
106: Operations panel;
107: Scanner;
108: Recording head controlling ASIC;
111: Flexible flat cable;
112: Recording head;
113: Carriage;
114: Feed unit;
115: Suction fin;
116: Paper ejecting unit;
200,600,700: Printer control board;
201: Quartz oscillator;
202,602: Spread spectrum clock generator;
209: CPU;
203: PLL circuit;
204: Printer image processing logic unit;
205: Speed conversion memory;
206: IO cell FF;
701: Analog signal generator; and
901: Frequency phase comparator.

Embodiment 1

Figure 1:
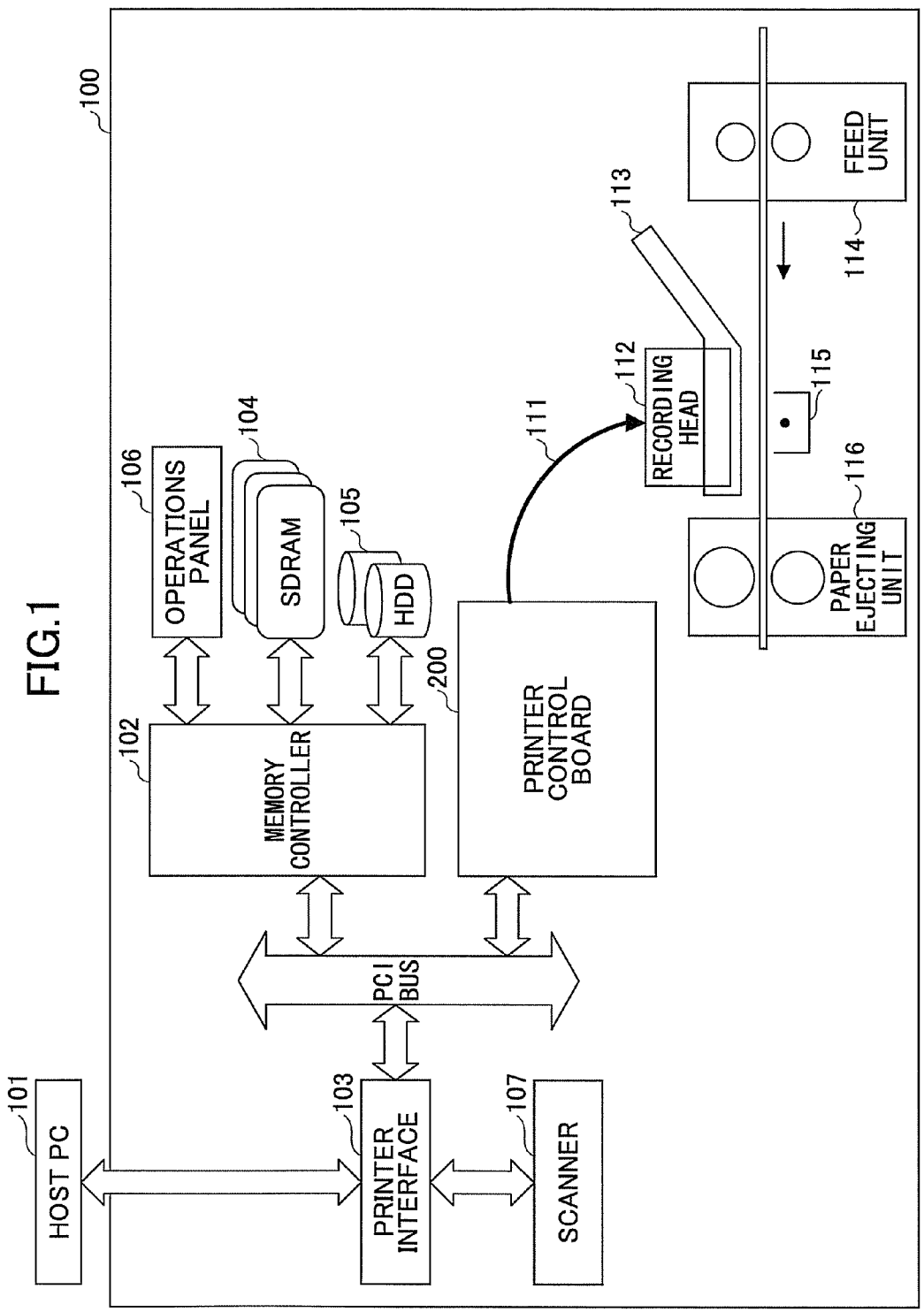
FIG. 1 is a schematic view of an inkjet printer of Embodiment 1.

FIG. 1 is a schematic structural view of an inkjet printer of Embodiment 1. An image forming apparatus 100 (hereinafter, referred to as image forming apparatus 100) including an inkjet printer of Embodiment 1 and a host Personal Computer (PC) 101 connected to the image forming apparatus 100) are illustrated in FIG. 1. The host PC 101 is a computer sending image data of various images to the image forming apparatus 100.

The image forming apparatus 100 includes a printer interface 103, a scanner 107, a memory controller 102, a printer control board 200, an operations panel 106, a Synchronous Dynamic Random Access Memory (SDRAM) 104, a Hard Disk Drive (HD) 105, a recording head 112, a carriage 113, a feed unit 114, a suction fan 115, and a paper ejecting unit 116.

The printer interface 103, the memory controller 102, and the printer control board 200 are connected by a PCI bus.

The printer interface 103 is such as a USB and a Centronics interface to which the scanner 107 is connected.

The operations panel 106, the SDRAM 104, and the HDD 105 are connected to the memory controller 102. The memory controller 102 receives image data from the host PC 101 via the printer interface 103 and the PCI bus and temporarily stores the received image data in the SDRAM 104 and the HDD 105. The memory controller 102 receives the image data read by the scanner 107 via the printer interface 103 and the PCI bus and stores the received image data into the SDRAM 104 and the HDD 105.

The printer control board 200 controls the image forming apparatus 100 in its entirety. The printer control board 200 requests the memory controller 102 to transfer the image data stored in the SDRAM 104 and the HDD 105. The memory controller 102 transfers the image data stored in the HDD 105 and the SDRAM 104 to the printer control board 200 via the PCI bus.

The image data transferred by the memory controller 102 are subjected to image processing by a recording head controlling ASIC (described below) included in the printer control board 200. The processed image data are converted into a data format which can be received by the recording head 112. Thereafter, the converted image data are transferred to the recording head 112 via a Flexible Flat Cable 111 (hereinafter, referred to as FFC 111).

The recording head 112 forms an image by discharging ink onto a paper fed by the feed unit 114. The recording head 112 is used as a recording unit for recording the image. However, the recording head is an example and any recording device may be used.

The carriage 113 moves the recording head 112 in a direction perpendicular to a paper feeding direction. With this operation, the image is formed on the paper in the main scanning direction. The suction fin is provided to stabilize a paper position in discharging the ink. The paper on which the image is formed is ejected outside the image forming apparatus 100 by the paper ejecting unit 16.

FIG. 2 is a block diagram illustrating the functional structure of the printer control board. The printer control board 200 includes a quartz oscillator 201, a Spread Spectrum Clock Generator 202 (hereinafter, referred to as SSCG 202), a CPU 209, and the recording head controlling Application Specific Integrated Circuit (ASIC) 108.

The CPU 209 controls the image forming apparatus 100 in its entirety. The quartz oscillator 201 oscillates a clock 1 (first clock signal).

The SSCG 202 carries out a spread spectrum process of receiving the clock 1 and providing frequency modulation by diffusing the frequency of the clock 1 with a predetermined frequency diffusion width. Thus, a clock 2 (a second clock signal) which is provided with the frequency modulation is output. The SSCG 202 is provided to reduce the EMI noise. The SSCG 202 is indispensable to follow a regulation value of EMI noise intensity. For electronic apparatuses such as an image forming apparatus, there are country regulations related to the EMI noise such as FCC, VCCI, and EN55022 in some countries.

The recording head controlling ASIC 108 controls the recording head 112. The recording head controlling ASIC includes a PLL circuit 203, a printer image processing logic unit 204, a speed conversion memory 205, and an IO cell FF (Flip Flop) 206 as illustrated in FIG. 2.

The PLL circuit 203 receives the clock 1 as a reference clock and outputs a clock 3 so as to synchronously oscillate at a frequency obtained by multiplying the frequency of the clock 1. The clock 3 (third clock signal) obtained by the frequency multiplying is used as a system clock of the printer image processing logic unit 204 and a write clock of the speed conversion memory 205.

The printer image processing logic unit 204 receives the clock 3, processes the image data transferred from the memory controller 102, and synchronously outputs the processed image data in synchronism with the clock 3. As described, the printer image processing logic unit 204 uses the clock 3 output from the PLL circuit 203 to perform a high-speed process. In Embodiment 1, the printer image processing logic unit 204 carries out a gradation process of image data and performs data interface (I/F).

The IO cell FF 206 is a flip flop which receives the image data input from the speed conversion memory 205 and the clock 2 provided with the frequency modulation and outputs the image data by latching the image data in synchronism with the clock 2 to the recording head 112.

The data processed by the printer image processing unit 204 are transferred to the recording head 112 via the IO cell FF 206 arranged in the vicinity of the speed conversion memory 205 and the output terminal of the recording head controlling ASIC 108.

The EMI noise is mainly generated by the FFC 111 when recording head data are transferred from the printer control board 200 to the recording head 112. By synchronizing the recording head data with the spread spectrum clock (frequency diffusion clock) using the SSCG 202, the frequency of the recording head data is diffused to thereby reduce the EMI noise generated from the FFC 111.

Figure 3A:
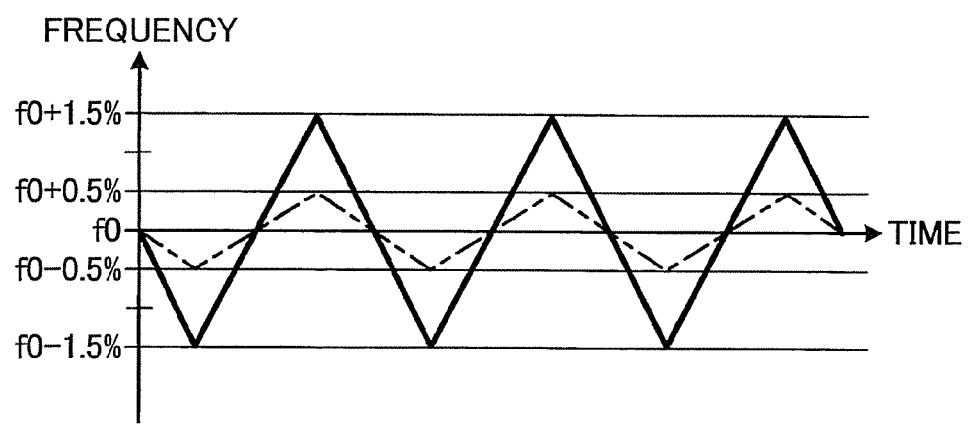
FIG. 3A is a graph illustrating frequencies obtained by comparing cases where a frequency diffusion width is 0% (OFF), ±0.5%, and ±15%.
Figure 3B:
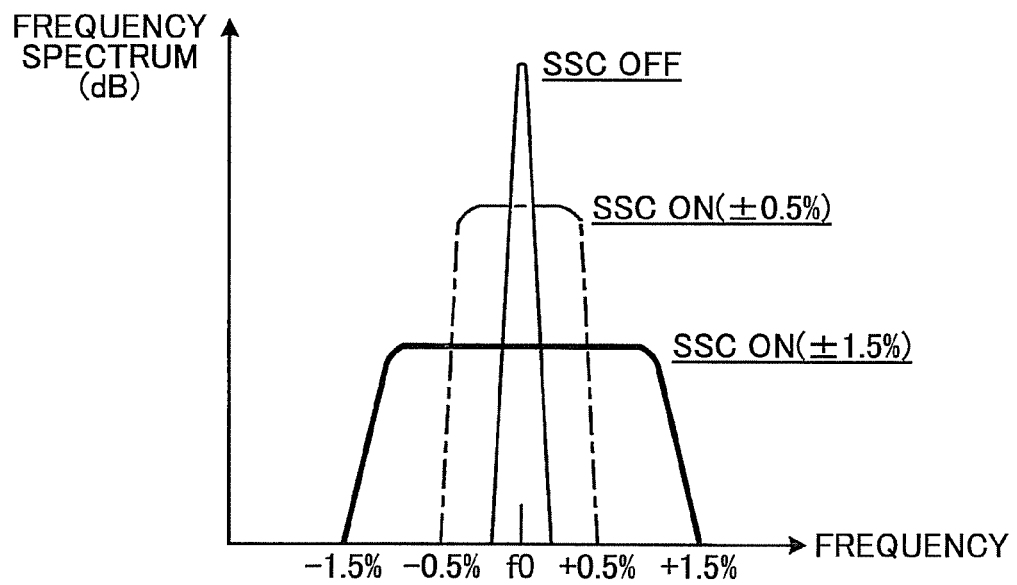
FIG. 3B is a graph illustrating frequency spectrums obtained by comparing cases where a frequency diffusion width is 0% (OFF), ±0.5%, and ±1.5%.

An effect of reducing the EMI noise using the SSCG 202 is described. Whether the EMI noise reducing effect is large or small relates to the frequency diffusion width. FIG. 3A is a graph illustrating frequencies obtained by comparing cases where a frequency diffusion width is 0% (OFF), ±0.5%, and ±1.5%. FIG. 3B is a graph illustrating a frequency spectrum obtained by comparing cases where a frequency diffusion width is 0% (OFF), ±0.5%, and ±1.5%.

As illustrated in FIG. 3A, when the frequency diffusion width is 0% (OFF), the frequency spectrum concentrates on the frequency f0 as illustrated in FIG. 3B. When the frequency diffusion width is ON, the frequency spectrum is diffused in a frequency diffusion range. As illustrated in FIG. 3B, the greater the diffusion range becomes, the broader the frequency spectrum becomes. Then, the EMI noise reduction effect becomes larger.

In the example of FIG. 3B, it is known that the maximum value of the frequency spectrum having a frequency diffusion width of ±1.5% reduces in comparison of that of a frequency diffusion width of ±0.5%.

As the EMI noise reduction without using the SSCG, there is a measure of adding a ferrite core, a measure of using the FFC 111 of a sealed type, or the like. However, in comparison with the EMI prevention using the SSCG, manufacturing costs may increase according to the measures.

FIG. 11 is a block diagram illustrating a functional structure of a comparative example printer control board in an image forming apparatus. Referring to FIG. 11, a clock 1 output from a quartz oscillator 201 is input as a system clock (clock 2) of a recording head controlling ASIC 1108 via an SSCG 1102. Specifically, as illustrated in FIG. 11, the clock 2 is input in the PLL circuit 203 inside a recording head controlling ASIC 1108.

A frequency diffusion width of the SSCG 1102 is limited by a PLL jitter standard value related to a PLL circuit 203 inside the recording head controlling ASIC 1108. For example, when the jitter standard value is 200 ps and the frequency of the clock 1 from the quartz oscillator 201 is 80 MHz, the tolerant maximum frequency diffusion width is 1.6% (±0.8%).

The frequency diffusion width of the SSCG may be set insteps of ±0.5%. Therefore, the frequency diffusion width can be selected out of OFF (±0%), ±0.5%, ±1.0%, and ±1.5%. In the above comparative example, the frequency diffusion width is selected as ±0.5%. If the frequency diffusion width such as ±1.0% or ±1.5% greater than the ±0.5% is set, the PLL circuit 203 cannot stably generate a stabilized frequency multiplying clock thereby causing the system operation of the recording head controlling ASIC 1108 to be unstable.

Referring to FIG. 2, in the printer control board 200 of Embodiment 1, two lines of the clock 1 output from the quartz oscillator 201 and the clock 2 obtained by passing through the SSCG 202 are input as a system clock of the recording head controlling ASIC 108.

The system clock of the clock 1 as a first line is input into the PLL circuit 203 inside the recording head controlling ASIC 1108. The clock 3 obtained with the frequency multiplying in the PLL circuit 203 is used as a clock for the printer image processing logic unit 204.

On the other hand, the clock 2 provided with the frequency diffusion and output from the SSCG 202 is input in the IO cell FF 206 without passing through the PLL circuit 203. Thereafter, the clock 2 is used by the IO cell FF 206 for transferring the recording head data. In the second line, since the clock 2 is not input in the PLL circuit 203, a limitation by the PLL jitter standard value in the frequency diffusion width can be ignored. With Embodiment 1, in comparison with the example illustrated in FIG. 11, it is possible to set the frequency diffusion width as great as possible to thereby sufficiently improve the performance of the image forming apparatus. According to the above case, the frequency diffusion width can be set up to ±1.5%.

Referring back to FIG. 2, the speed conversion memory 205 is a First-in first-out (FIFO) memory which receives the image data output from the printer image processing logic unit 204, the clock 2 and the clock 3, writes the image data from the image processing logic unit 204, and outputs the image data to the IO cell FF 206 in synchronism with the clock provided with the frequency diffusion.

With Embodiment 1, the clock 2 provided with the frequency diffusion by the SSCG 202 and the clock 1 which is not provided with the frequency diffusion are used as a system clock of the recording head controlling ASIC 108. However, the following problem may occur.

When the image data processed in synchronism with the clock 3 which is not provided with frequency diffusion is synchronized by the clock 2 provided with the frequency diffusion in the IO cell FF 206, there is jitter caused by the frequency diffusion. Therefore, when the IO cell FF 206 latches the image data output in synchronism with the clock 3, an asynchronous timing is generated and an unstable output may be generated by a timing error. With Embodiment 1, the speed conversion memory 205 is provided in a previous stage of the IO cell FF 206 to thereby prevent the asynchronous timing from occurring.

Figure 4:
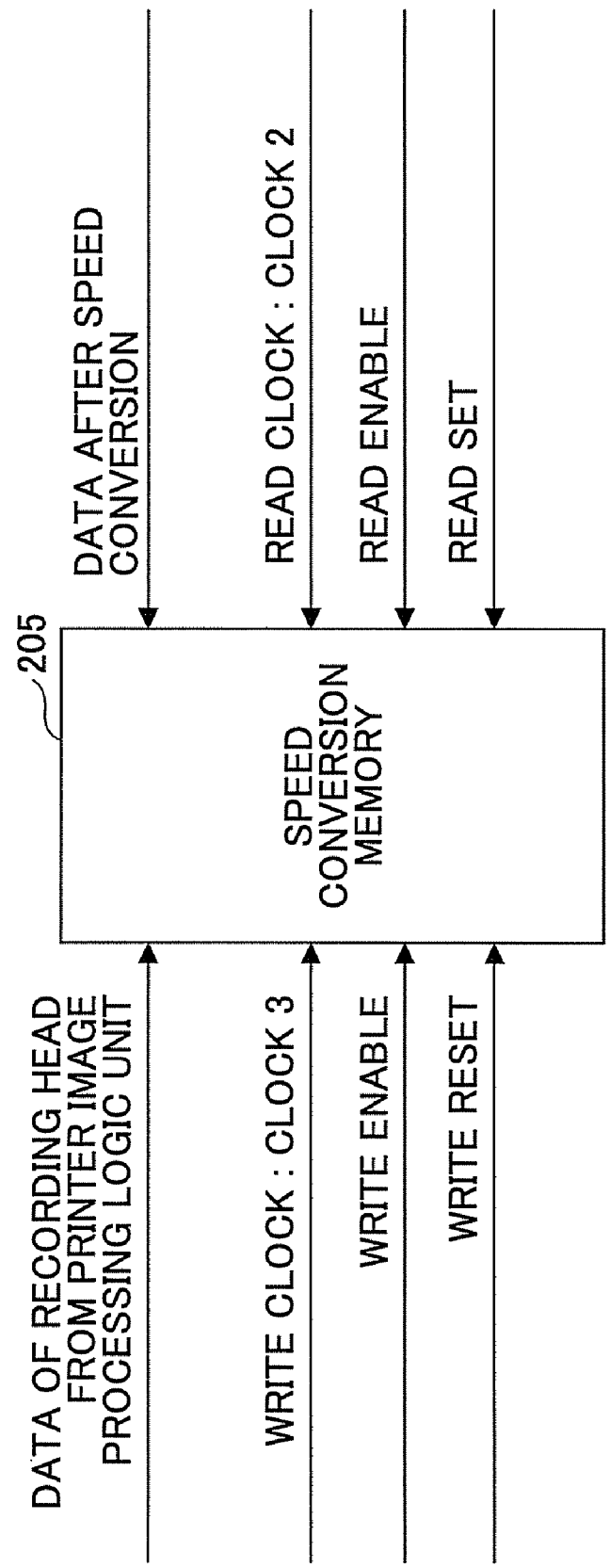
FIG. 4 illustrates inputs and outputs of a speed conversion memory.
Figure 5:
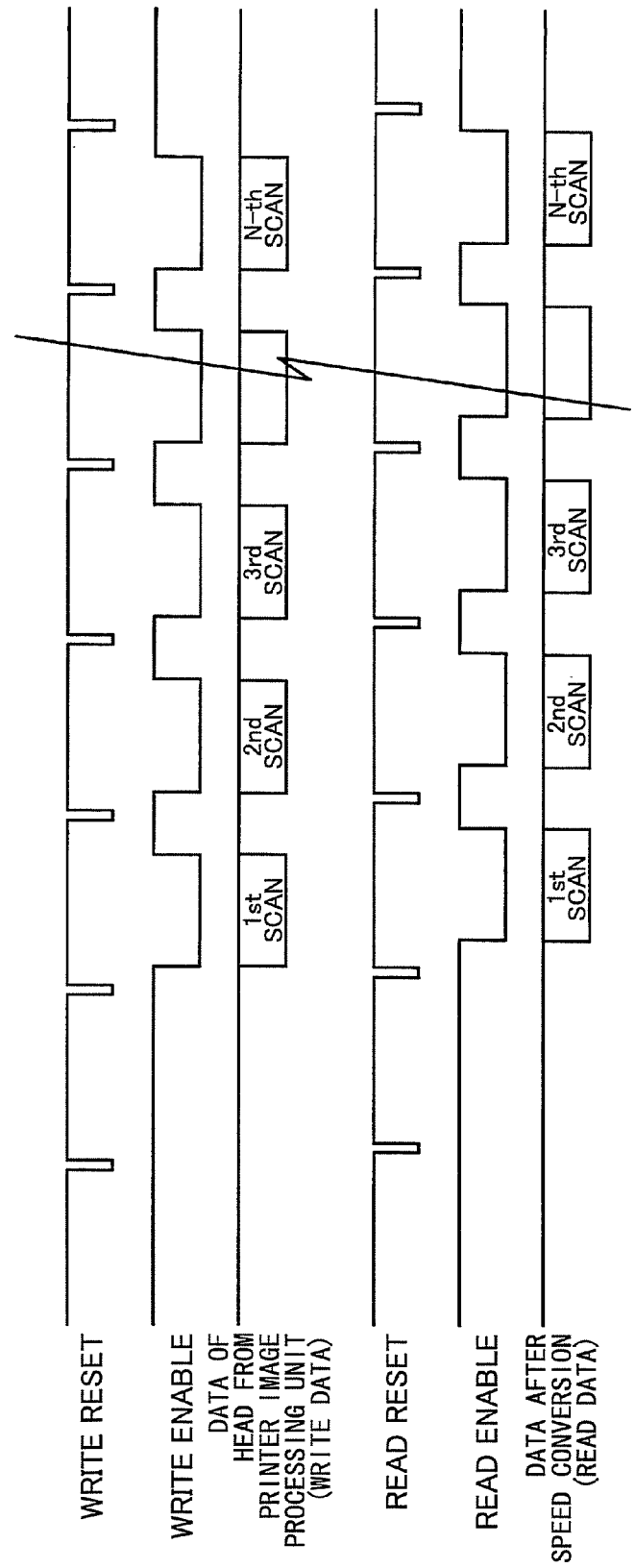
FIG. 5 is a timing chart of the speed conversion memory.

FIG. 4 illustrates inputs and outputs of the speed conversion memory 205. FIG. 5 is a timing chart of the speed conversion memory 205.

The speed conversion memory 205 is a FIFO memory having dual ports through which a synchronous clock input, an enable signal, and a reset signal on a read side and a synchronous clock input, an enable signal, and a reset signal on a write side are in communication. Image data from the printer image processing logic unit 204 are input in a write data bus.

The clock 3 which is not provided with the frequency diffusion is input as a write clock on the write side, and the clock 2 which is provided with the frequency diffusion is input as a read clock on the read side. The write enable signal and read enable signal have an assert width within which is the data amount processed by the recording head in a single scanning. Reset is asserted between enable asserts generated each scan.

Referring to FIG. 5, in synchronism with the clock 3 which is not provided with the frequency diffusion, image data for one scan operation are written from the printer image processing logic unit 204 to the speed conversion memory 205. In synchronism with the clock 2 which is provided with the frequency diffusion, the written image data for one scan are output to the IO cell FF 206. With this, the image data output from the speed conversion memory 205 can be latched, without unstable output, as the recording head data after the speed conversion by the IO cell FF 206 synchronizing with the clock 2 which is provided with the frequency diffusion.

As described, Embodiment 1 employs the two lines of system clocks in the recording head controlling ASIC 108. The clock 1 is input in the printer image processing logic unit 204 which requires stability without passing through the SSCG 202 as the first line. The clock 2 is input in the IO cell FF 206 via the SSCG 202 as the second line. Then, without being limited by the jitter standard value of the PLL circuit 203, the spectrum can be diffused using the greater frequency diffusion width. With Embodiment 1, EMI noise can be reduced while avoiding unstable system operation of the recording head controlling ASIC 108.

The image forming apparatus of Embodiment 1 includes an inkjet printer. Therefore, it is difficult to eliminate the EMI noise with the FFC 111 since the FFC 111 moves along with the movement of the recording head 112. However, in Embodiment 1, the EMI noise generated in the FFC 111 can be reduced with the printer control board 200, but the EMI prevention may not be done with the moving FFC 111.

Embodiment 2

An image forming apparatus of Embodiment 2 is provided to reduce the EMI noise by inputting a clock into two SSCGs provided to give different frequency diffusion widths to obtain two system clocks of two lines.

Figure 6:
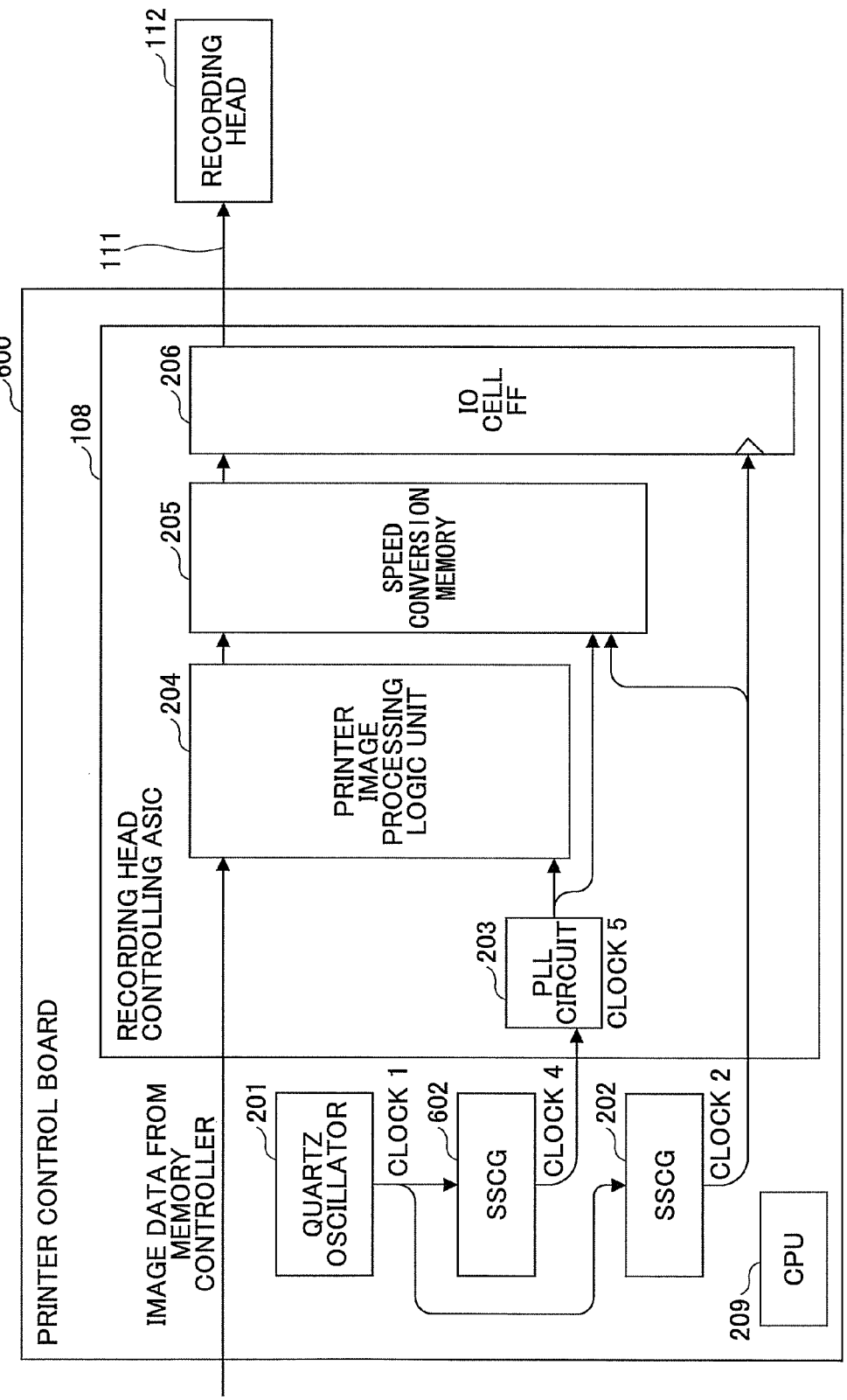
FIG. 6 is a block diagram illustrating a functional structure of a printer control board of Embodiment 2.

FIG. 6 is a block diagram illustrating a functional structure of a printer control board of Embodiment 2. The schematic structure of the image forming apparatus including a printer control board 600 of Embodiment 2 is similar to that of Embodiment 1.

The printer control board 600 of Embodiment 2 includes a quartz oscillator 201, an SSCG 202, an SSCG 602, a CPU 209, and a recording head controlling ASIC 108. With Embodiment 2, a couple of the SSCG 202 and the SSCG 602 are included in the printer control board 600 as illustrated in FIG. 6. Functions and structures of the quartz oscillator 201, the SSCG 202, the CPU 209, and the recording head controlling ASIC 108 are similar to those of Embodiment 1.

The SSCG 602 carries out a spread spectrum process of receiving the clock 1 and providing frequency modulation by diffusing the frequency of the clock 1 with a predetermined frequency diffusion width. Thus, a clock 4 (a fourth clock signal) which is provided with the frequency modulation is output. The frequency diffusion width of the SSCG 602 is set smaller than the frequency diffusion width of the SSCG 202 and to satisfy the jitter standard value of the PLL circuit 203.

With Embodiment 2, the clock 1 output from the quartz oscillator 201 is provided with frequency diffusion by the SSCG 202 and the SSCG 602, which give different frequency diffusion widths to the signal 1. Thereafter, system clocks of the two lines, i.e., the clock 2 provided with the frequency diffusion (frequency modulation) and the clock 4 provided with the frequency diffusion (frequency modulation), are input in the recording head controlling ASIC 108.

As the first line, the clock 4 provided with the frequency diffusion by the SSCG 602 is input in the PLL circuit 203 in the recording head controlling ASIC 108. The ELL circuit 203 applies frequency multiplying to the clock 4 to obtain a clock 5 and outputs the obtained clock 5.

The clock 5 obtained with the frequency multiplying by the PLL circuit 203 is used as a system clock of the printer image processing logic unit 204 and a write clock of the speed conversion memory 205. On the other hand, the clock 2 provided with the frequency diffusion by the SSCG 202 is used as a read clock of the speed conversion memory 205 and a synchronizing clock of an IO cell FF 206.

Since the frequency diffusion width of the SSCG 202 is not limited by the jitter standard value of the PLL circuit 203, it is possible to increase the frequency diffusion width 202 to be greater than the frequency diffusion width of the SSCG 602.

The EMI noise may be generated not only from a FFC 111 connecting the printer control board 600 and the recording head 112 but also from the printer control board 600. With Embodiment 2, the SSCGs 202 and 602 are provided with the frequency diffusion by the clocks of the two lines to the recording head controlling ASIC 108. With this, the EMI noise generating from the printer control board 600 can be reduced.

With Embodiment 2, the clock 2 obtained with the frequency diffusion by the SSCG 202 is input in the IO cell FF 206, and the clock 4 obtained with the frequency diffusion by the SSCG 602 different from the SSCG 202 is input as a reference clock to the PLL circuit 203. Therefore, the reference clock of the PLL circuit 203 is provided with frequency diffusion within a range of the jitter standard value. In Embodiment 2, the EMI noise generated by the FFC 111 and the EMI noise generated by the printer control board 600 on which the recording head controlling ASIC 108 is mounted can be reduced without affecting a stable operation of the recording head controlling ASIC 108. Therefore, it is possible to further reduce the EMI noise with Embodiment 2.

The frequency diffusion width of the SSCG 202 may be set greater than the frequency diffusion width of the SSCG 602. Said differently, the frequency diffusion width given by the SSCG 602 is limited by the jitter standard value of the PLL circuit 203, and the frequency diffusion width given by the SSCG 202 is not limited as such. Therefore, it is possible to set the frequency diffusion width to be the maximum value of the performance of the SSCG 202. Therefore, it is possible to further reduce the EMI noise with Embodiment 2.

Embodiment 3

An image forming apparatus of Embodiment 3 is provided to control phases of the SSCG 202 and SSCG 602 of Embodiment 2.

FIG. 7 is a block diagram illustrating a functional structure of a printer control board 700 of Embodiment 3. The schematic structure of the image forming apparatus including a printer control board 700 of Embodiment 3 is similar to that of Embodiment 1.

The printer control board 700 of Embodiment 3 includes a quartz oscillator 201, an SSCG 202, an SSCG 602, an analog signal generator 701, a CPU 209, and a recording head controlling ASIC 108 as illustrated in FIG. 7. With Embodiment 3, the printer control board 700 includes the SSCG 202 and the SSCG 602 in a similar manner to Embodiment 2, and further includes the analog signal generator 701 not like Embodiment 2.

Functions and structures of the quartz oscillator 201, the SSCG 202, the SSCG 602, the CPU 209, and the recording head controlling ASIC 108 are similar to those of Embodiment 2.

Figure 8A:
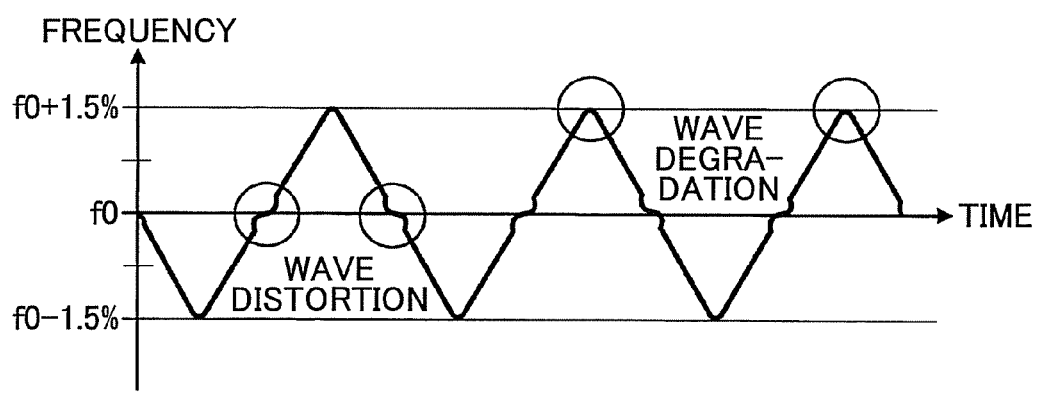
FIG. 8A is a graph of frequencies as characteristics of an SSCG.
Figure 8B:
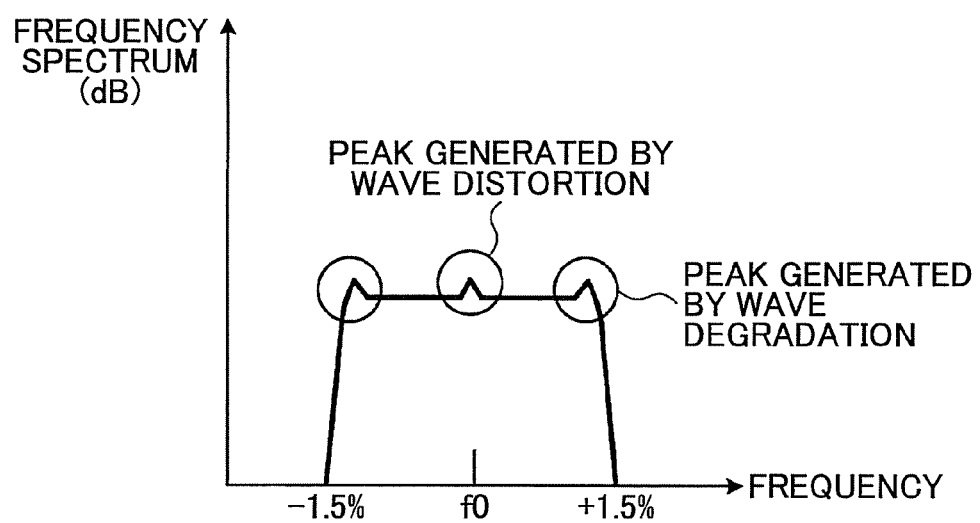
FIG. 8B is a graph of a frequency spectrum as characteristics of the SSCG.

FIG. 8A is a graph of frequencies as characteristics of an SSCG. FIG. 8B is a graph of a frequency spectrum as characteristics of an SSCG.

Referring to FIG. 8A, as characteristics of the SSCG, there are distortion in the vicinity of a frequency f0 of a frequency modulated waveform and degradation in the vicinities of the maximum value and the minimum value of the frequency modulated waveform. With the distortion and degradation, a peak appears in the frequency spectrum as illustrated in FIG. 8B. A margin for the regulation value of the EMI noise intensity is insufficient.

Especially, when there is no measure to control the phases of the frequency modulated waveforms by the SSCG 202 and the SSCG 602, the phases may vary depending on errors in the SSCG 202 and the SSCG 602 and ambient conditions or the like. Therefore, there is a likelihood that generating timings of the peaks caused by the distortions of the waveforms which are generated in the spectrums of the SSCG 202 and the SSCG 602 concur. In this case, the EMI noise intensity around a frequency f0 further increases to cause an insufficient margin.

With Embodiment 3, the analog signal generator 701 is provided to thereby input an analog voltage waveform to the SSCG 202 and the SSCG 602 from the analog signal generator 701. With this, the phases of the frequency modulated waveforms from the SSCG 202 and the SSCG 602 are controlled to thereby prevent the distortion and the degradation of the frequency modulated waveform from occurring.

Even if the generating timings of the degradation in the vicinities of the maximum and minimum frequencies of the frequency modulated waveforms from the SSCG 202 and the SSCG 602 concur, because the frequencies are different depending on a difference between the frequency diffusion widths set in the SSCG 202 and the SSCG 602, the EMI noise intensity does not increase.

Figure 9:
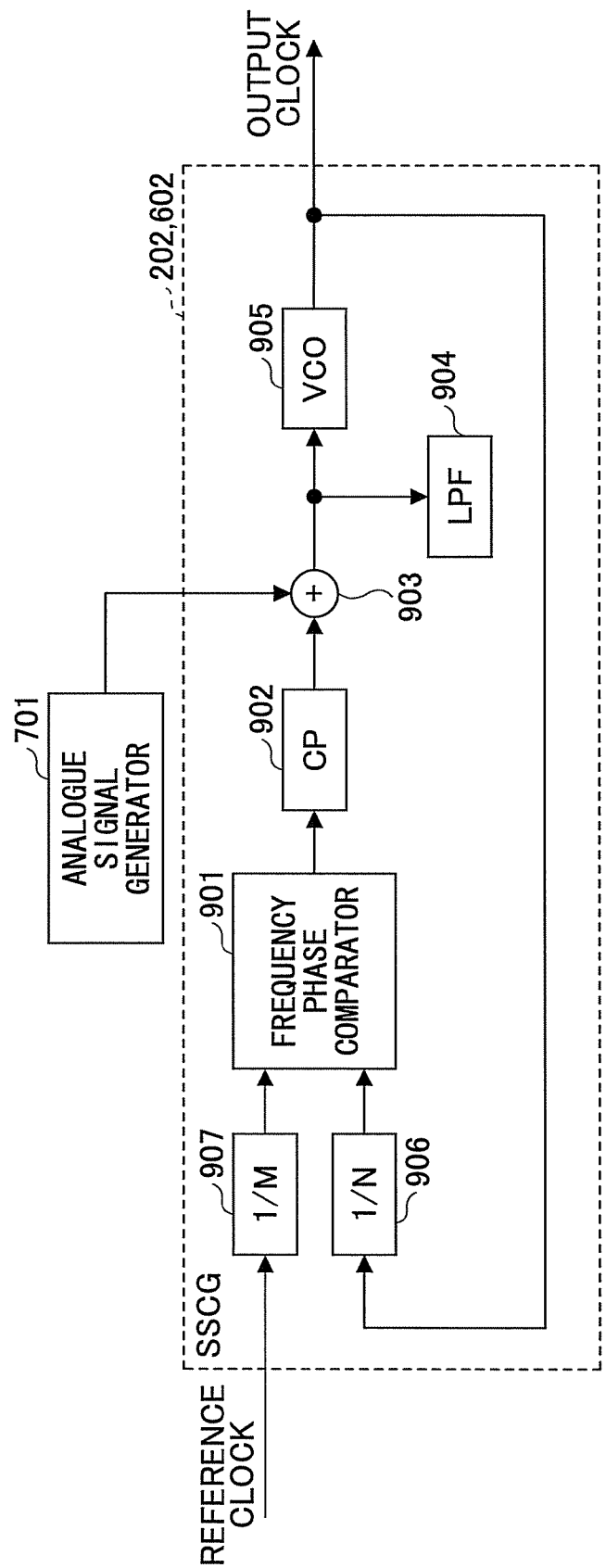
FIG. 9 is a block diagram illustrating a functional structure of two SSCGs of Embodiment 3.

FIG. 9 is a block diagram illustrating a functional structure of the two SSCGs 202 and 602 of Embodiment 3. Referring to FIG. 3, the SSCGs 202 and 602 of Embodiment 3 include frequency dividers 906 and 907, a frequency phase comparator 901, a charge pump circuit (CP) 902, a voltage adder 903, a low pass filter (LPF) 904, and a voltage control oscillator 905. An example SSCG includes an analog signal generator inside the SSCG, and an analog voltage waveform generated in the analog signal generator is input in the voltage adder 903. However, in the SSCGs 202 and 602 of Embodiment 3, the analog signal generator is not provided inside the SSCG and an analog voltage waveform is input in the voltage adder 903 from the external analog signal generator 701 via a dedicated outer terminal.

The two analog voltage waveforms having different phases are generated by the analog signal generator 701, and the two generated analog voltage waveforms are separately input respectively in the SSCG 202 and SSCG 602. With this, the phases of the frequency modulated waveforms from the SSCG 202 and the SSCG 602 are shifted, and it is possible to prevent the phases from matching.

Figure 10:
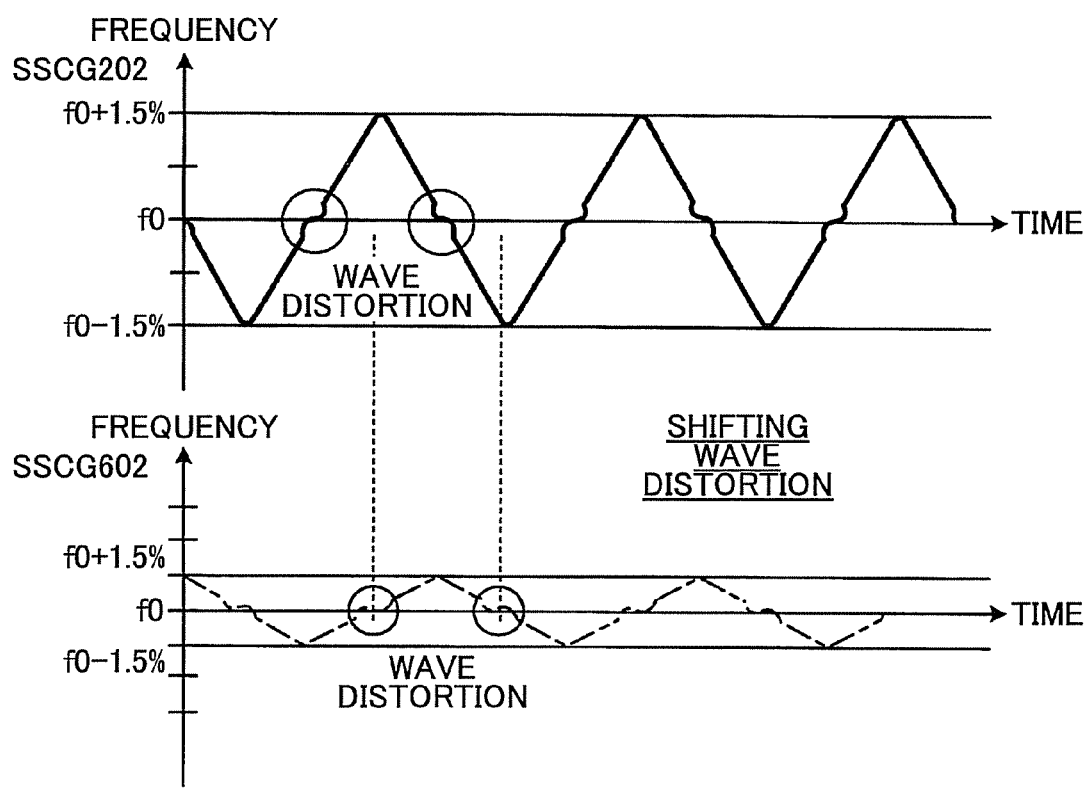
FIG. 10 illustrates an EMI reducing effect occurring by shifting the phases of frequency modulation waveforms from the two SSCGs.

FIG. 10 illustrates the EMI reducing effect performed by shifting the frequency modulated waveforms from the SSCG 202 and the SSCG 602. Referring to FIG. 10, by shifting the phases of the frequency modulated waveforms from the SSCG 202 and the SSCG 602, output timings of the distortions of the frequency modulated waveforms may be shifted. Thus, it is possible to prevent generating timings of the peaks caused by the distortion generated in the spectrums from the SSCG 202 and the SSCG 602 concurring thereby further reducing the EMI noise.

With Embodiment 3, when the phases of the frequency modulated waveforms from the two SSCGs 202 and 602 are shifted, it is preferable to set an output frequency difference to be 120 kHz or more. A spectrum analyzer used for measuring the EMI noise intensity has a band range of resolution performance of 120 kHz. When the output frequency difference is 120 kHz or more, the spectrums of the two clocks are not added, and the EMI noise reduction is attained when the image forming apparatus is actually used or the EMI noise is measured.

With Embodiment 3, since the phases of the frequency modulated waveforms of the two SSCGs 202 and 602 are shifted by an analog voltage waveform input from the external analog signal generator 701, it is possible to control the generating timings of the peaks of the spectrums generated in the vicinity of the central frequencies f0 of the clocks provided with the frequency diffusion to prevent the generating timings from concurring. Thus, it is possible to prevent an increment of the peak in the vicinity of the frequency f0 to thereby obtain the enhanced EMI reducing effect.

In Embodiment 1, Embodiment 2, and Embodiment 3, the image forming apparatuses including the inkjet printers are exemplified. However, the present invention is not limited to this, and is applicable to a printer of other than the inkjet type, and a copier, a scanner, a multifunction peripheral having at least two functions among copying, printing, scanning and facsimile functions and including a printer of other than the inkjet type. Further, the present invention may be applicable to data transfer to a recording measure (writing measure) other than an inkjet printer.

Further, with Embodiment 3, the recording head controlling ASIC 108 uses the ASIC as a circuit for controlling the recording unit (head 112). However, the measure for controlling the recording unit (head 112) is not limited to the ASIC and may be a FPGA or the like.

In Embodiment 1, Embodiment 2, and Embodiment 3, the image forming apparatuses are exemplified. However, the present invention is not limited to these, and is applicable to any electric apparatus on which a control board transfers a signal to the outside and that includes a PLL circuit.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made thereto without departing from the spirit and scope of the invention.

This patent application is based on Japanese Priority Patent Application No. 2010-063310 filed on Mar. 18, 2010, the entire contents of which are hereby incorporated herein by reference.

What is claimed is:
1. An image forming apparatus comprising:
a recording unit configured to record image data on a recording medium;
a first spread spectrum clock generator configured to receive a first clock signal, provide the first clock signal with frequency diffusion to have a first predetermined frequency diffusion width, and output a second clock signal which is provided with the frequency diffusion;
a PLL circuit configured to receive the first clock signal and output a third clock signal synchronously oscillating at a frequency obtained by multiplying the frequency of the first clock signal;

an image processing unit configured to receive the third clock signal, process the image data, and output the processed image data in synchronism with the third clock signal;

a speed conversion unit configured to receive the second and third clock signals, receive the processed image data in synchronism with the third clock signal, and output the processed image data in synchronism with the second clock signal;

an input and output control unit configured to receive the image data output from the speed conversion unit and the second clock signal, and output the image data to the recording unit in synchronism with the second clock signal; and a second spread spectrum clock generator configured to receive the first clock signal, provide the first clock signal with frequency diffusion to have a second predetermined frequency diffusion width, and output a fourth clock signal which is provided with the frequency diffusion;

wherein the PLL circuit receives the fourth clock signal and outputs a fifth clock signal synchronously oscillating at a frequency obtained by multiplying the frequency of the fourth clock signal, the image processing unit receives the fifth clock signal and outputs the processed image data in synchronism with the fifth clock signal, and the speed conversion unit receives the second and fifth clock signals, receives the processed image data in synchronism with the fifth clock signal, and outputs the processed image data in synchronism with the second clock signal.

2. The image forming apparatus according to claim 1, wherein the first predetermined frequency diffusion width and the second predetermined frequency diffusion width are different.

3. The image forming apparatus according to claim 2, wherein the first predetermined frequency diffusion width is greater than the second predetermined frequency diffusion width.

4. The image forming apparatus according to claim 1, further comprising:

an analog signal generator configured to generate an analog voltage waveform, wherein the first and second spread spectrum clock generators control phases of frequency modulated waveforms of the second and fourth clock signals from the first and second spread spectrum clock generators, respectively, with the analog voltage waveform.

5. The image forming apparatus according to claim 1, wherein a frequency difference between the second clock signal from the first spread spectrum clock generator and the fourth clock signal from the second spread spectrum clock generator is 120 kHz or more.

6. An electric apparatus comprising: a first spread spectrum clock generator configured to receive a first clock signal, provide the first clock signal with frequency diffusion to have a first predetermined frequency diffusion width, and output a second clock signal which is provided with the frequency diffusion;

a PLL circuit configured to receive the first clock signal and output a third clock signal synchronously oscillating at a frequency obtained by multiplying the frequency of the first clock signal;

a processing unit configured to receive the third clock signal, process predetermined data, and output the processed predetermined data in synchronism with the third clock signal;

a speed conversion unit configured to receive the second and third clock signals, receive the processed predetermined data in synchronism with the third clock signal, and output the processed predetermined data in synchronism with the second clock signal;

an input and output control unit configured to receive the predetermined data output from the speed conversion unit and the second clock signal, and output the predetermined data to the recording unit in synchronism with the second clock signal; and a second spread spectrum clock generator configured to receive the first clock signal, provide the first clock signal with frequency diffusion to have a second predetermined frequency diffusion width, and output a fourth clock signal which is provided with the frequency diffusion;

wherein the PLL circuit receives the fourth clock signal and outputs a fifth clock signal synchronously oscillating at a frequency obtained by multiplying the frequency of the fourth clock signal, the processing unit receives the fifth clock signal and outputs the processed predetermined data in synchronism with the fifth clock signal, and the speed conversion unit receives the second and fifth clock signals, receives the processed predetermined data in synchronism with the fifth clock signal, and outputs the processed predetermined data in synchronism with the second clock signal.

7. The electric apparatus according to claim 6, wherein the first predetermined frequency diffusion width and the second predetermined frequency diffusion width are different.

8. The electric apparatus according to claim 7, wherein the first predetermined frequency diffusion width is greater than the second predetermined frequency diffusion width.

9. The electric apparatus according to claim 6, further comprising:

an analog signal generator configured to generate an analog voltage waveform, wherein the first and second spread spectrum clock generators control phases of frequency modulated waveforms of the second and fourth clock signals from the first and second spread spectrum clock generators, respectively, with the analog voltage waveform.

10. The electric apparatus according to claim 6, wherein a frequency difference between the second clock signal from the first spread spectrum clock generator and the fourth clock signal from the second spread spectrum clock generator is 120 kHz or more.

11. A recording control method carried out by an image forming apparatus including a recording unit for recording image data on a recording medium, the recording control method comprising:

receiving a first clock signal, providing the first clock signal with frequency diffusion to have a first predetermined frequency diffusion width, and outputting a second clock signal which is provided with the frequency diffusion;

receiving the first clock signal and outputting a third clock signal synchronously oscillating at a frequency obtained by multiplying the frequency of the first clock signal;

receiving the third clock signal, processing the image data, and outputting the processed image data in synchronism with the third clock signal;

receiving the second and third clock signals, receiving the processed image data in synchronism with the third clock signal, and outputting the processed image data in synchronism with the second clock signal;

receiving the output image data and the second clock signal, and outputting the image data to the recording unit in synchronism with the second clock signal; and receiving the first clock signal, providing the first clock signal with frequency diffusion to have a second predetermined frequency diffusion width, and outputting a fourth clock signal which is provided with the frequency diffusion;

wherein, in addition to the receiving of the first clock signal in a PLL circuit, receiving the fourth clock signal and outputting a fifth clock signal synchronously oscillating at a frequency obtained by multiplying the frequency of the fourth clock signal, wherein, in addition to the receiving of the third clock signal in an image processing unit, receiving the fifth clock signal and outputting the processed image data in synchronism with the fifth clock signal, and wherein, in addition to the receiving of the second and third clock signals in a speed conversion unit, receiving the second and fifth clock signals, receiving the processed image data in synchronism with the fifth clock signal, and outputting the processed image data in synchronism with the second clock signal.

12. The recording control method according to claim 11, wherein the first predetermined frequency diffusion width and the second predetermined frequency diffusion width are different.

13. The recording control method according to claim 12, wherein the first predetermined frequency diffusion width is greater than the second predetermined frequency diffusion width.

14. The recording control method according to claim 11, further comprising:
generating an analog voltage waveform; and
controlling phases of frequency modulated waveforms of the second and fourth clock signals with the analog voltage waveform.

15. The recording control method according to claim 11, wherein a frequency difference between the second clock signal from a first spread spectrum clock generator and the fourth clock signal from a second spread spectrum clock generator is 120 kHz or more.

* * * * *